United States Patent
Somasundaram

(10) Patent No.: US 12,143,655 B2
(45) Date of Patent: *Nov. 12, 2024

(54) DEVICE LOCATION DETERMINATION

(71) Applicant: Nagravision S.A., Cheseaux-sur-Lausanne (CH)

(72) Inventor: Thiru balaji Somasundaram, Bangalore (IN)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,383

(22) Filed: Dec. 6, 2022

(65) Prior Publication Data

US 2023/0098925 A1 Mar. 30, 2023

Related U.S. Application Data

(63) Continuation of application No. 17/309,608, filed as application No. PCT/EP2019/086312 on Dec. 19, 2019, now Pat. No. 11,570,499.

(30) Foreign Application Priority Data

Dec. 21, 2018 (EP) ..................................... 18215300

(51) Int. Cl.
*H04N 21/254* (2011.01)
*H04N 21/258* (2011.01)
(Continued)

(52) U.S. Cl.
CPC ... *H04N 21/2541* (2013.01); *H04N 21/25841* (2013.01); *H04N 21/25875* (2013.01);
(Continued)

(58) Field of Classification Search
CPC ......... H04N 21/2541; H04N 21/25875; H04N 21/6582
See application file for complete search history.

(56) References Cited

U.S. PATENT DOCUMENTS

| 11,570,499 B2 | 1/2023 | Somasundaram |
| 2012/0094696 A1* | 4/2012 | Ahn .................. H04N 21/6582 455/457 |

(Continued)

FOREIGN PATENT DOCUMENTS

| CN | 103262644 | 8/2013 |
| CN | 108369620 | 8/2018 |

(Continued)

OTHER PUBLICATIONS

"U.S. Appl. No. 17/309,608, Non Final Office Action mailed Mar. 23, 2022", 13 pgs.

(Continued)

*Primary Examiner* — Michael R Telan
(74) *Attorney, Agent, or Firm* — SCHWEGMAN LUNDBERG & WOESSNER, P.A.

(57) ABSTRACT

In overview, the disclosed methods, devices, and systems enable the location of the first device to be verified. In particular, second location verification data is generated using a current location of the second device is provided to a first device by a second device which can be matched with first location verification data received by the first device from a server, the first location verification data is generated using a stored location of the first device. If the first and second location verification data match, the location of the first device is considered to have been verified.

20 Claims, 7 Drawing Sheets

(51) Int. Cl.
   *H04N 21/414*   (2011.01)
   *H04N 21/422*   (2011.01)
   *H04N 21/426*   (2011.01)
   *H04N 21/658*   (2011.01)

(52) U.S. Cl.
   CPC . *H04N 21/41407* (2013.01); *H04N 21/42204* (2013.01); *H04N 21/42684* (2013.01); *H04N 21/6582* (2013.01)

(56) References Cited

U.S. PATENT DOCUMENTS

| | | | |
|---|---|---|---|
| 2012/0117209 A1 | 5/2012 | Sinha | |
| 2015/0230004 A1 | 8/2015 | Vanduyn et al. | |
| 2015/0289005 A1* | 10/2015 | Holmquist | H04N 21/2396 725/25 |
| 2016/0316248 A1* | 10/2016 | Hao | H04N 21/4367 |
| 2018/0063263 A1* | 3/2018 | Bandela | H04N 21/44224 |
| 2018/0249222 A1* | 8/2018 | Bandela | H04N 21/25808 |
| 2022/0021918 A1 | 1/2022 | Somasundaram | |

FOREIGN PATENT DOCUMENTS

| | | |
|---|---|---|
| CN | 108702294 | 10/2018 |
| CN | 113287320 A | 8/2021 |
| EP | 2184885 A2 | 5/2010 |
| EP | 3857903 | 11/2023 |
| IN | 202117031990 A | 12/2021 |
| JP | 2008217109 A | 9/2008 |
| WO | WO-2020127736 A1 | 6/2020 |

OTHER PUBLICATIONS

"U.S. Appl. No. 17/309,608, Notice of Allowance mailed Sep. 7, 2022", 6 pgs.
"U.S. Appl. No. 17/309,608, Response filed Jun. 23, 2022 to Non Final Office Action mailed Mar. 23, 2022", 10 pgs.
"European Application Serial No. 18215300.7, Extended European Search Report mailed Mar. 20, 2019", 8 pgs.
"European Application Serial No. 19831701.8, Response filed Dec. 2, 2021 to Communication Pursuant to Article 94(3) EPC mailed Nov. 30, 2021", 11 pgs.
"European Application Serial No. 19831701.8, Communication Pursuant to Article 94(3) EPC mailed Nov. 30, 21", 6 pgs.
"European Application Serial No. 19831701.8, Response Filed Dec. 2, 2021 to Response filed Dec. 2, 2021 to Communication Pursuant to Article 94(3) EPC mailed Nov. 30, 2021", W/ Claims, 8 pgs.
"International Application Serial No. PCT/EP2019/086312, International Preliminary Report on Patentability mailed Jul. 1, 2021", 7 pgs.
"International Application Serial No. PCT/EP2019/086312, International Search Report mailed Jan. 29, 2020", 4 pgs.
"International Application Serial No. PCT/EP2019/086312, Written Opinion mailed Jan. 29, 2020", 6 pgs.
"Indian Application Serial No. 202117031990, Response filed Jul. 12, 2023 to First Examination Report mailed Jan. 12, 2023", 21 pgs.
"Chinese Application Serial No. 201980083641.9, Office Action mailed Jul. 28, 2023", with machine translation, 24 pgs.
"Indian Application Serial No. 202117031990, First Examination Report mailed Jan. 12, 2023", 6 pgs.
U.S. Appl. No. 17/309,608, filed Jun. 9, 2021, Device Location Determination.
"Chinese Application Serial No. 201980083641.9, Response filed Dec. 5, 2023 to Office Action mailed Jul. 28, 2023", w english claims, 16 pgs.
"European Application Serial No. 23198006.1, Extended European Search Report mailed Nov. 28, 2023", 8 pgs.

* cited by examiner

DEVICE LOCATION DETERMINATION

PRIORITY APPLICATIONS

This application is continuation of U.S. patent application Ser. No. 17/309,608, filed on Jun. 9, 0221, which is a U.S. National Stage filing under 35 U.S.C. § 371 of PCT Patent Application No. PCT/EP2019/086312, filed on Dec. 19, 2019, which claims priority to European Patent Application No. 18215300.7, filed on Dec. 21, 2018, both of which applications are incorporated herein by reference in their entireties.

FIELD

The present disclosure relates to a method of verifying the location of a device, such as a set-top boxes (STBs), smart devices, OTT (over the top) devices, and gaming consoles. Verification of the location of the device can be required in order for a user to gain access to functions and/or services provided by the device, for example media content.

BACKGROUND

Devices such as set-top boxes (STBs), smart devices, OTT devices, and gaming consoles are generally provided to a customer along with a subscription to services provided by a media content provider, such as video, audio, internet web pages, interactive video games, amongst other things. The device is configured such that it can only be used in conjunction with a valid subscription. This can be exploited by moving a device associated with a valid subscription to a different location either to facilitate access by friends and family, who do not have a valid subscription, to content, or for larger audience content consumption, again where members of the larger audience do not have a valid subscription. There is a need to prevent devices being used in such a way such that the likelihood of content being viewed without a subscription is reduced. Some methods to control access to content are based on the geographic location of the device. Some devices don't support back channel communications. Therefore, there is a need to validate use of the device even if a back channel is not available. In some cases, users do not want to share their location. Therefore, there is a need to validate use of the device without sharing the user's location.

DETAILED DESCRIPTION OF THE DRAWINGS

Figure 1:
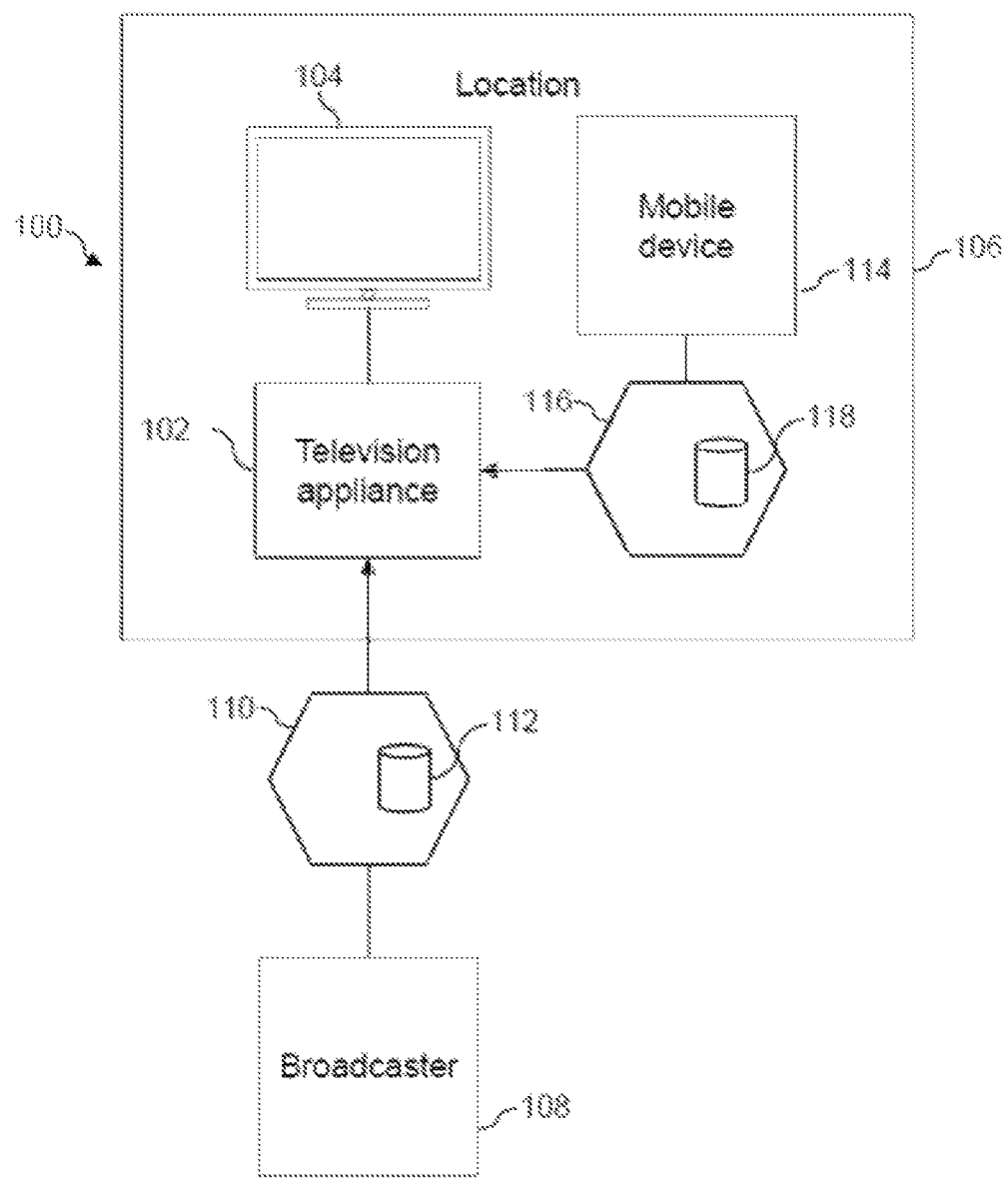
FIG. 1 illustrates an environment in which location determination of location of a television appliance is taking place.

In overview, the disclosed methods, devices, and systems enable the location of the first device to be verified. In particular, second location verification data is generated using a current location of the second device is provided to a first device by a second device which can be matched with first location verification data received by the first device from a server, the first location verification data is generated using a stored location of the first device. The stored location may be obtained by, for example, during installation of the first device as the location or address at which the device is installed. The stored location may be verified by comparing the location or address at which the device is installed with a registered address of the user of the first device. If the first and second location verification data match, the location of the first device is considered to have been verified.

By comparing the first location verification data generated based on a stored location of the device with the second location verification data generated based on the current location of the second device, the location of the first device can be verified, if the first and second location verification data are determined to match. In some implementations, in the case of a match, a function of the device can be enabled if it had been previously disabled. If the first and second location verification data are not determined to match, a function of the device can be disabled or can be maintained in a disabled state if it has already been disabled. In this way, access to a function of the device can be restricted. For example, where the device is a television appliance, such as a STB, access to media content can be restricted when location of the device cannot be verified.

In some aspects of the disclosure a method of verifying a location of a first device is provided. First location verification data from a server is received at the first device, for example via satellite/IP/Cable. The first location verification data is generated using a stored location of the first device (for example, a location stored at the server). Second location verification data from a second device is also received at the first device. The second location verification data is generated using a current location of the second device (for example, a location obtained by the first device using location determining means such as GPS). The location of the first device is verified by determining whether the second location verification data matches the first location verification data.

In some implementations, if the second location verification data matches the first location verification data, a disabled function of the first device may be enabled. Further, the enabled function of the first device may then be disabled once more after a predetermined period of time has elapsed following the enabling of the function. Once the function has been enabled, advantageously, the function can automatically be disabled after a predetermined period has elapsed. This period of time could be, for example, one of 10 days, 30 days or 60 days. This would require the user to periodically enable the function.

In some implementations, the first location verification data may be generated using a first timestamp and/or a Unique ID of the first device, in addition to the stored location of the first device. The second location verification data may be generated using a second timestamp and/or a Unique ID of the first device in addition to the current location of the second device. Determining whether the second location verification data matches the first location verification data may comprise determining whether the first timestamp falls within a predetermined period of time of the second timestamp. This predetermined period of time could be any one of 5 days, 24 hours, 12 hours and 1 hour, 30 minutes, 1 minute. If this condition is not met, the location of the first device may not be verified and a function of the device is either disabled or remains disabled.

In some implementations, determining whether the second location verification data matches the first location verification data may comprise determining whether the Unique IDs used to generate the first location verification data and the second location verification data match. If this condition is not met, the location of the first device may not be verified and a function of the device is either disabled or remains disabled.

In some implementations, the second location verification data may be received from the second device via a third device. The second location verification data may be sent from the second device to the third device via a short-range communication mechanism. The second location verification data may be sent from the third device to the first device via a short-range communication mechanism. The third device may comprise a remote control for controlling the first device and the first location verification data may comprise a first remote control key code and, optionally, the first location verification data may comprise first remote control key codes. The second location verification data may comprise a second remote control key code and, optionally, the second location verification data may comprise second remote control key codes.

The stored location of the first device, the first timestamp and the Unique ID of the first device may be used to generate the first remote control key code or codes. The current location of the second device, the second timestamp and the Unique ID of the first device may be used to generate the second remote control key code or codes.

Determining whether the second location verification data matches the first location verification data may comprise determining whether the first remote control key code matches the second remote control key code. Alternatively, determining whether the second location verification data matches the first location verification data may comprise determining whether the first remote control key codes match the second remote control key codes where the first and second location verification data respectively comprise first and second remote control key codes.

In some implementations, the first location verification data may be generated at the server. The second location verification data may be generated at the second device. The step of verifying the location of the first device by determining whether the second location verification data matches the first location verification data may be performed at the first device. The second location verification data may be generated by the second device. The second location verification data may not be sent to the server. The second location verification data may be received from a second device via a short-range communication mechanism. The short-range communication mechanism may only be capable of communicating over distances of one of 100 metres or less, 50 metres or less, or 10 metres or less. The short-range communication mechanism may be one or more of: near-field communication; Bluetooth™; and infrared radiation data transmission. Advantageously, this means that the second location verification data can only be received from the second device when it is a short distance from the first device (e.g. one of 100 metres or less, 50 metres or less, or 10 metres or less).

In some implementations, the first location verification data may be received after a request to enable a previously disabled function of the first device has been sent to the server by the second device. Determining whether the second location verification data matches the first location verification data may comprise determining whether the current location of the second device is within a predetermined distance from the stored location of the first device. This predetermined distance could be may be any one of 200, 100, 50 and 10 meters and may be in the form of a geo-fence.

In some aspects of the disclosure, a method of providing data for use in verifying a location of a first device is provided. A current location of the second device is obtained at a second device. Second location verification data is generated at a second device. The second location verification data is generated using the current location of the second device. The second location verification data is sent to the first device for use in verifying the location of the first device.

In this way, data is provided to the first device which can be used in verifying the location of the first device. Advantageously, the second device is able to provide the second location verification data without the need to send/share any location data to a third-party operator.

In some implementations, a request to enable a previously disabled function of the first device may be sent to a server. This may be in response to a user input at the second device. Advantageously, in this way, a user is able to initialise the enabling of a function of the first device using the second device. The second location verification data may be generated using a second timestamp and/or a Unique ID of the first device in addition to the current location of the second device.

In some implementations of the above methods, the second device may comprise a smart device, such as a mobile device, tablet, or smart watch. The first device may comprise a media consumption device. The first device may be a television appliance comprising a television broadcast receiver for receiving broadcast media content. The stored location of the first device may be provided to the server by a user of the first device for example at the time of installation of the first device or via a location update procedure when the user changes the address at which the device is to be registered.

Also disclosed are a first device, second device, a system comprising a first device and a second device.

It will be understood that, in the context of the present disclosure, a short-range communication mechanism is any mechanism by which two devices only capable of communicating over short distances. Short distances may be defined as one of 100 metres or less, 50 metres or less, or 10 metres or less. Examples of short-range communication mechanisms include short range electromagnetic communications e.g. near-field communication (NFC), WiFi, and Bluetooth™, acoustic signal communications e.g. ultrasonic signals, and optical signal communications, e.g. infrared radiation (IR) data transmission. An alternative short-range communication mechanism may rely on the localized nature of a local area network such that the first device and the second device communicate over a local area network.

A unique identifier (Unique ID) is any identifier which, for a given set of objects, is unique among all identifiers used for those objects and for a specific purpose. In the context of a television appliance, a Unique ID may be used uniquely identify each television appliance or a particular model produced by a particular manufacturer.

A timestamp is the time at which an event is recorded by a computer. Where a timestamp is provided in relation to verification data, as described below, the timestamp is the time at which the computer has recorded the generation of the verification data.

A remote control is a device used to control a first device, which may be a media consumption device or television appliance, such as a STB. Remote control key codes are the specific signal sent by the remote control to the first device. The remote control key codes enable the first device to understand what action is being requested by the remote control. Each key of the remote control (e.g. "Channel up", "Volume up"), when activated, sends a specific signal (remote control key code) to the first device, such that the first device is able to differentiate between signals generated by different keys of the remote control. The first device will only respond (e.g. by performing the requested action) if the signal (remote control key code) sent by the remote control corresponds with an expected signal (remote control key code).

The first device can be provisioned with the remote control key codes it expects to receive from the remote control by a manufacturer/operator of the first device via satellite/Cable/IP and store these remote control key codes. The stored remote control key codes can be used to determine whether a signal (remote control key code) sent by the remote control corresponds with an expected signal (remote control key code). The remote control will need to send the same remote control key codes to the first device as are stored on the first device in order for the requested action to happen when a key of the remote control (e.g. "Channel up", "Volume up") is activated in order for the requested action to be carried out by the first device. If the remote control key codes do not match those stored on the first device, the first device will not perform the requested action.

In one embodiment, a method at a first device of verifying a location of the first device comprises receiving first location verification data from a server at the first device, wherein the first location verification data is generated at the server using a stored location of the first device; receiving second location verification data from a second device located within a predetermined range of the first device at the first device, wherein the second location verification data is generated using a current location of the second device; and verifying that a location of the first device is within the predetermined range of the current location of the second device by comparing the second location verification data with the first location verification data.

In some aspects of the disclosure, the predetermined range is determined by a range of a short-range communication mechanism, and the second verification data is received from the second device directly or indirectly using the short-range communication mechanism.

In some aspects of the disclosure, a method at a server of verifying a location of a first device comprises storing first location verification data for a location of the first device; receiving second location verification data from the first device located within a predetermined range of a second device, wherein the second location verification data is generated, using a current location of the second device, and transmitted to the first device; and verifying that a location of the first device is within the predetermined range of the current location of the second device by determining whether the second location verification data matches with the first location verification data.

Hence, the verification process can be performed at the server based on stored data on the location of the first device and data received from the second device indicating the general location of the first device within range of the second device.

The first location of the first device may comprises an authorized geographic area, and the verifying that the location of the first device is within the predetermined range of the current location of the second device comprises verifying that the first device lies within the authorized geographic area.

The first location verification data may be based on a unique ID of the first device, the second location verification data may be generated based on a unique ID of the first device, and the verifying that the location of the first device is within the predetermined range of the current location of the second device may include determining whether the unique IDs of the first and second location verification data match.

The predetermined range may be determined by a range of a short-range communication mechanism, and the second verification data is received from the second device directly or indirectly using the short-range communication mechanism.

The server can use the result of the verification process to determine how to control the first device e.g. whether to enable or disable the device or a function of the device. Control can be provided by a control signal transmitted to the first device over a communications network by the server.

The concepts of this disclosure are applicable to verifying the location of any type of first device e.g. a first device that does not have an ability to determine its own location, by using location data from a second device within a range of the first device. The locality of the second device within a short range of the first device allows some separation but ensures that the second device can be used to determine the location of the first device within a geographic area.

The first device may be a static device, a portable device or a mobile device.

Some specific embodiments are now described by way of illustration with reference to the accompanying drawings in which like reference numerals refer to like features.

With reference to FIG. 1, a television appliance 102 is connected to a television 104. In some implementations, the television appliance 102 may be integrated with the television 104, for example in the case of a smart television. The television appliance 102 and the television 104 are both located at a location 106. A broadcaster 108 broadcasts signals to the television appliance 102. The signals comprise data 110. The data comprises first location verification data 112 for use in verifying the location of the television appliance 102. The broadcast signals may further comprise media content for output to the television appliance 102.

A mobile device 114 is also located at location 106. The mobile device transmits data 116 to the television appliance 102 via a short-range communication mechanism such as near-field communication (NFC), Bluetooth™ or infrared radiation (IR) data transmission. The data comprises second location verification data 118 for use in verifying the location of the television appliance 102.

In an example implementation, the television appliance 102 may include a remote control (not shown) and the mobile device may be configured to transmit data 116 to the remote control and the remote control is used to control the television appliance 102. In this example implementation, the data 116 may include remote control key codes which enable the remote control to request an action of the television appliance 102, such as a change in channel or a change in volume.

Figure 2:
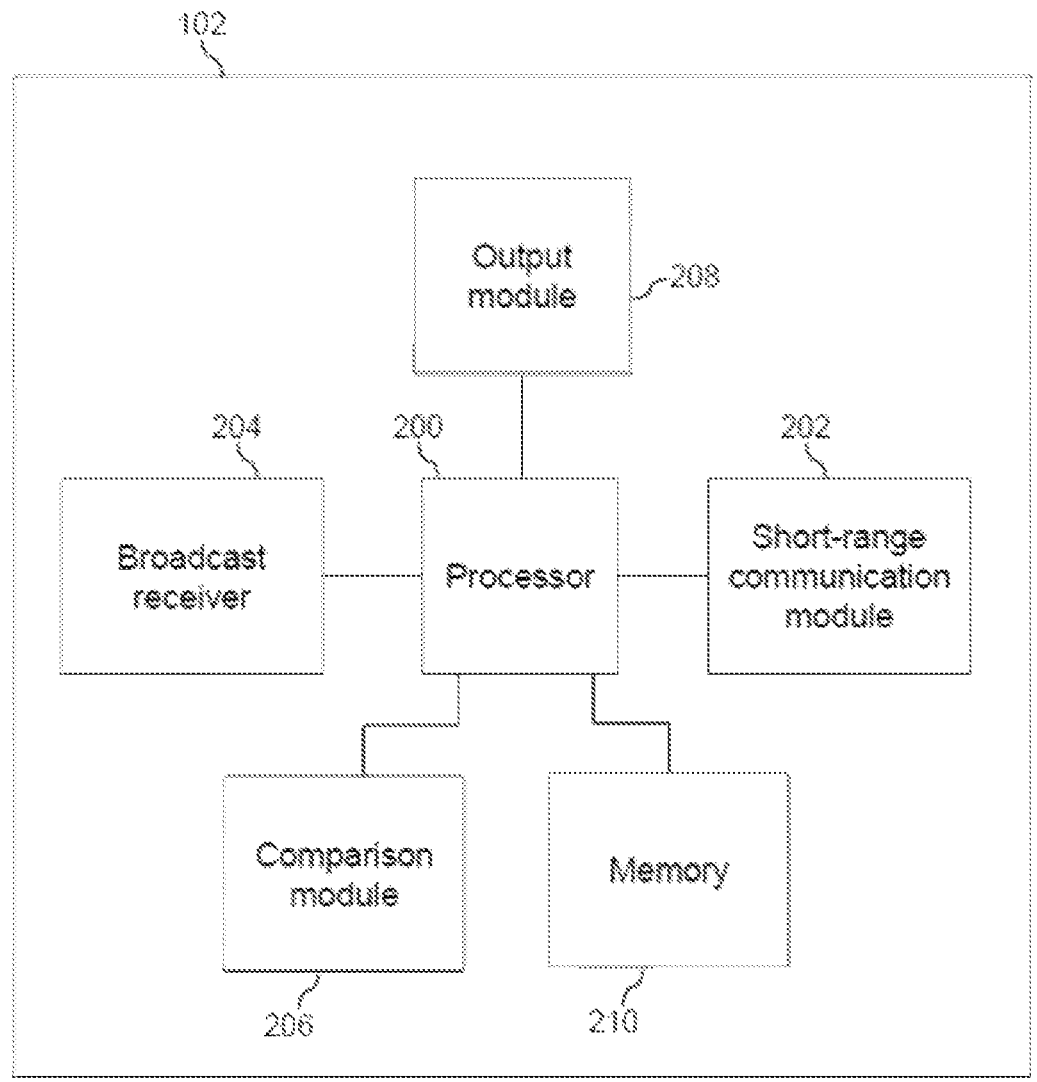
FIG. 2 illustrates the television appliance of FIG. 1.

With reference to FIG. 2, the television appliance 102 comprises a processor 200, a short-range communication module 202, a television broadcast receiver 204, for example a satellite TV receiver, cable for receiver of terrestrial TV receiver, a comparison module 206 and an output module 208. The processor 200 is configured to coordinate between the short-range communication module 202, the broadcast receiver 204, the comparison module 206 and the output module 208. A memory 210 is also provided for storing instructions for execution by the processor 200 to cause the processor 200 to provide desired functionality.

The television appliance 102 may also comprise a network communication module (not depicted) for connection to a network such as a telecommunications network, for example, the internet or a mobile (cellular) network.

The short-range communication module 202 is arranged to send data to, and receive data from, the mobile device 114, including receiving the second location verification data 118 from the mobile device 114, via a short-range communication mechanism. In some implementations, the short-range communication module 202 is only capable of communicating over distances of one of 100 metres or less, 50 metres or less, or 10 metres or less. The broadcast receiver 204 is arranged to receive signals from the broadcaster 108, including signals comprising the first location verification data 112. The comparison module 206 is arranged to verify the location 106 of the television appliance 102 by determining whether the first location verification data 112 matches the second location verification data 118 in a manner which is described in greater detail below. The output module 208 is arranged to output media content to the television 104.

In an alternative implementation, the aforementioned network communication module (not depicted) of the television appliance 102 may be arranged to receive the first location verification data 112 from the broadcaster 108, as well as media content for output to the television appliance 102, via a network. In this instance, the broadcaster 108 may be referred to as a content provider or a content provider server. For the purposes of this application, the term broadcaster is used in the description of example implementations, however it will be understood that the broadcaster can equally be a content provider, a content provider server.

Figure 3:
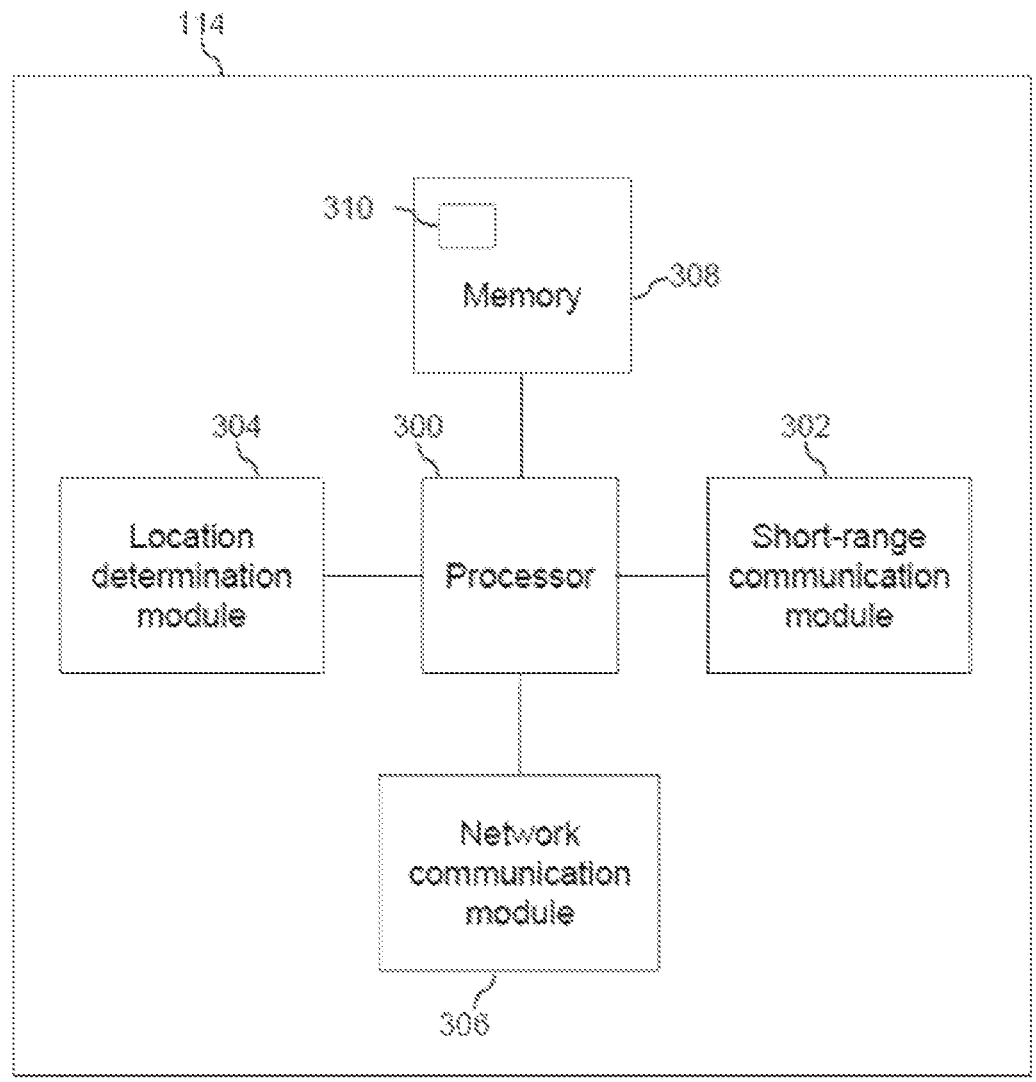
FIG. 3 illustrates the mobile device of FIG. 1.

With reference to FIG. 3, the mobile device 114 comprises a processor 200, a short-range communication module 302, a location determination module 304, a network communication module 306, a memory 308 and an application 310 stored in the memory 308. The processor 200 is configured to coordinate between the short-range communication module 302, the location determination module 304, the network communication module 306 and the application 310. The memory 308 can store instructions for execution by the processor 300 to cause the processor 202 to provide desired functionality.

The short-range communication module 302 is arranged to send data to, and receive data from, the television appliance 102, including sending the second location verification data 118 to the television appliance 102, via a short-range communication mechanism. In some implementations, the short-range communication module 202 is only capable of communicating over distances of one of 100 metres or less, 50 metres or less, or 10 metres or less. The location determination module 304 is arranged to determine the location of the mobile device 114. The location determination module 304 may comprise a Global Positioning System, GPS, receiver which can be used to determine the location of the mobile device 114. The network communication module 306 can send and receive data via a network (not depicted). During an initialisation of the device, the application 310 may be downloaded to the memory 308 via a network and the network communication module 306. The application 310 may be provided by the broadcaster 108 and may be used by a user of the mobile device to request enablement of a function of the television appliance 102 and/or generate the second location verification data 118, as described in more detail below. In some implementations, the application 310 may also be used to configure a remote control of the television appliance 102.

It will be understood that the present disclosure is applicable to media consumption devices in general, for example a television appliance as described above, an internet connected device, or any other media consumption device, or indeed any other device for which location is to be determined. In other words, wherever reference is made to a television appliance, media consumption device, or the like in this document, this could equally be any device for which location is to be verified and not necessarily a media consumption device. It is noted that, where a remote control is referred to in relation to a media consumption device or television appliance, this could equally be a remote control for any device for which location is to be verified and not just a media consumption device or television appliance.

It will also be understood that the broadcaster 108 may be implemented as a server. In other words, wherever reference is made to a broadcaster 108 or the like in this document, this could equally be any server providing data to a device, such as a television appliance 102.

Figure 4:
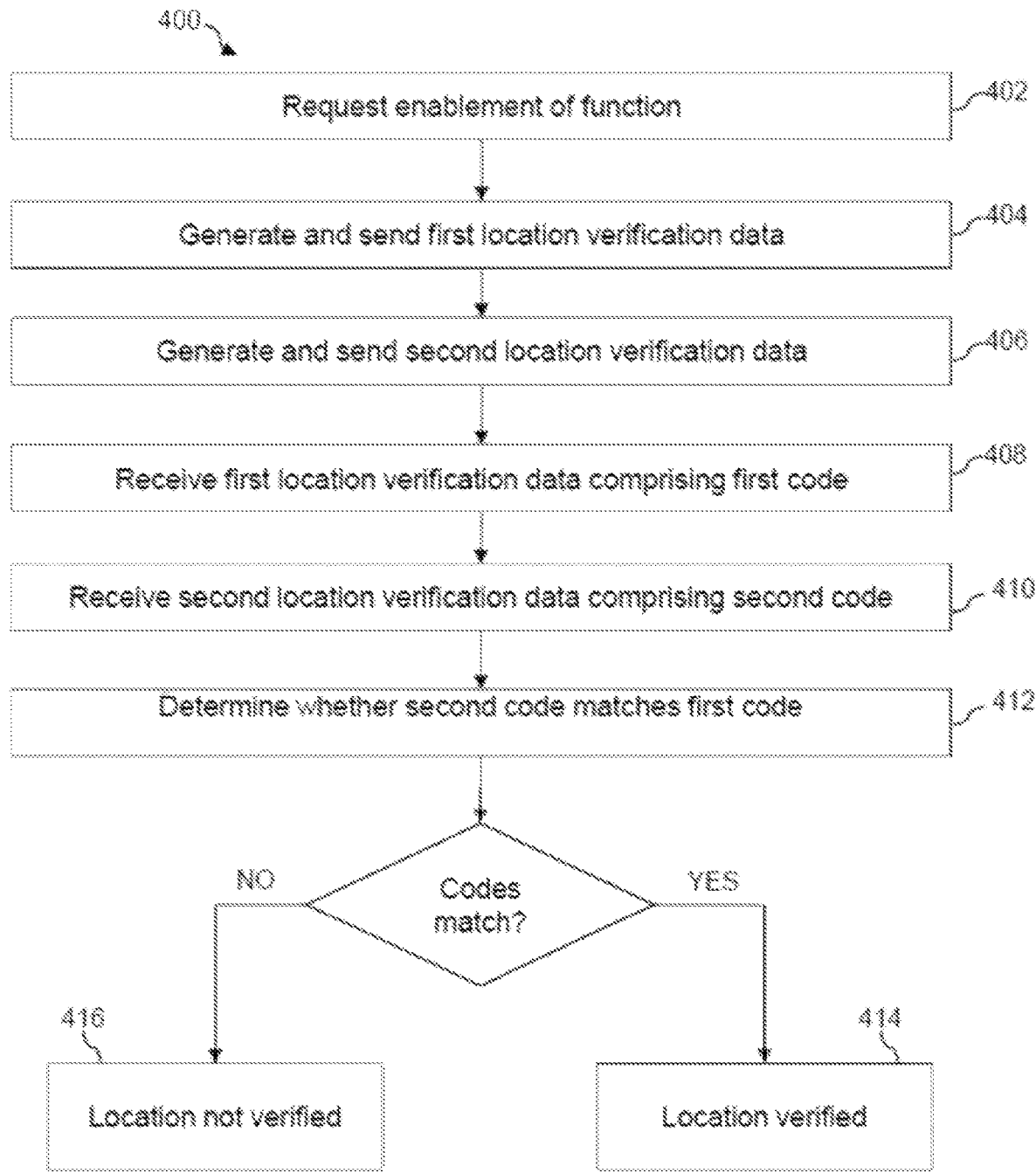
FIG. 4 illustrates of verifying the location of a device, such as a television appliance.

A method 400 of verifying the location of a device such as the television appliance 102 is now described with reference to FIG. 4. At the point at which the method begins, a function of the television appliance 102 has been disabled. This could be the result of a predetermined period of time, for example any of 60, 30 or 10 days, having elapsed since this function of the television appliance 102 was last enabled. Alternatively, the television appliance 102 may be provided to the user by a distributor in a state with a function disabled and the user is required to enable the function in order to use the television appliance 102.

In some implementations, a function of the television appliance 102 being disabled may prevent the whole device from operating. Alternatively, the functionality of the television appliance 102 may simply be reduced. If the below method is carried out successfully, meaning that the location of the television appliance 102 has been successfully verified, the disabled television appliance 102, or function of the television appliance 102, is re-enabled.

Examples of the disabling of a function of the television appliance 102 include: disabling a remote control of the television appliance 102 by changing the remote control key codes stored at on the television appliance 102 so that they no longer match those of the remote control meaning that the television appliance 102 can no longer be controlled using the remote control; preventing user access to particular media content, such as premium content; and implementing parental controls.

Turning now to the first step in the method, at step 402, the user of the television appliance 102 requests enablement of the disabled television appliance 102 function by sending a request for enablement to the broadcaster 108. Where the remote control of the television appliance 102 has been disabled, this step could take the form a request to re-enable a remote control of the television appliance 102.

In an example implementation, the request may be generated via the application 310 on the mobile device 114 provided by the broadcaster 108 which can communicate with the broadcaster 108, via a network, using the network communication module 306. As part of the request, the user may enter a Unique ID of the television appliance 102 via the application 310 which may be used to form part of the request and which may be sent to the broadcaster 108. A request timestamp may, optionally, also form part of the request which is sent to the broadcaster 108 and which indicates a time at which the request was generated.

Rather than the request being generated via the application 310, in an alternative implementation, a web portal provided by the broadcaster 108 may be used by the user to generate the request. The Unique ID of the television appliance 102 may be entered into the web portal by the user so as to generate the request. The web portal may be accessed via a web browser on the mobile device 114. The broadcaster 108 may receive the request, including the Unique ID of the television appliance 102 and, optionally, a request timestamp, via the web portal.

In a further alternative implementation, a request may be generated by scanning an optical, machine-readable, representation of data such as a barcode or QR code. When a function of the television appliance 102 is disabled, the television appliance 102 may output an optical, machine-readable, representation of data via the output module 208 such that it is displayed by the television 104. The user can use the mobile device 114 to scan the optical, machine-readable, representation of data, for example using the application 310 and a camera (not depicted) of the mobile device 114. The optical, machine-readable, representation of data comprises Unique ID of the television appliance 102 which can then be used by the application 310 to generate the request, this data being forwarded on to the broadcaster 108, optionally, alongside a request timestamp.

In a further alternative implementation, the request could be initiated via a user interaction with the television appliance 102 which may send the Unique ID of the television appliance 102 and, optionally, a request timestamp to the broadcaster 108, via a network, using the network communication module (not depicted) of the television appliance 102.

At step 404, following receipt of the request for enablement of the disabled television appliance 102 function, the first location verification data 112 is generated by the broadcaster 108, for example at a server of the broadcaster, and sent to the television appliance 102 by the broadcaster 108, either via the signals comprising data 110 or via a network as discussed above. In an alternative implementation, the first location verification data 112 is automatically generated by the broadcaster 108 following expiry of a predetermined period of time since the television appliance 102 of function of the television appliance 102 was last enabled.

The first location verification data is generated using an algorithm which takes a stored location of the television appliance 102, a first timestamp and the Unique ID of the television appliance 102 as inputs. The Unique ID of the television appliance 102 is obtained from the received request for enablement.

The stored location of the television appliance 102 is a location stored by the broadcaster 108, for example, at a database to which the broadcaster 108 has access. Where the broadcaster 108 is implemented as a server, the server can access the database to retrieve the stored location of the first device. The broadcaster 108 may use the Unique ID of the television appliance 102 to retrieve the stored location of the television appliance 102. The stored location of the television appliance 102 may be a location provided by the user of the television appliance 102 upon purchase of the television appliance 102, such as an address, post code or zip code.

The broadcaster 108 may check the request timestamp against a current time and, if the check indicates that the request was generated more than a permitted period of time before the current time, the request may be refused and the first location verification data 112 would not be generated. This prevents old requests from being used repeatedly or mistakenly.

In the example implementation where the remote control of the television appliance 102 has been disabled, for example by changing the remote control key codes of the television appliance 102 so that they no longer match with those of the remote control, the first location verification data comprises first remote control key codes for the remote control which are used to enable communication between the remote control and the television appliance 102. The stored location of the television appliance 102, the first timestamp and the Unique ID of the television appliance 102 are used to generate the first remote control key codes.

At step 406, the second location verification data 118 is generated at the mobile device 114 and sent to the television appliance 102 via the aforementioned short-range communication between the short-range communication module 302 of the mobile device 114 and the short-range communication module 202 of the television appliance 102.

The second location verification data 118 is generated using an algorithm which takes a current location of the mobile device 114, a second timestamp and the Unique ID of the television appliance 102 as inputs. The algorithm may be the same as that used by the broadcaster 108 in step 404. The second location verification data 118 may be generated by the application 310.

The current location of the mobile device 114 is obtained by the location determination module 304. The Unique ID of the television appliance 102 has either already been made available to the mobile device 114, for example where it has been input into the application 310 by the user, otherwise the user is requested to input the Unique ID of the television appliance 102, for example, by the application 310.

In the example implementation where the remote control of the television appliance 102 has been disabled, the second location verification data 118 comprises second remote control key codes for the remote control which are used to enable communication between the remote control and the television appliance 102. The current location of the mobile device 114, the second timestamp and the Unique ID of the television appliance 102 are used to generate the second remote control key codes at the mobile device 114. The second location verification data 118 is sent to a remote control of the television appliance 102 by the mobile device 114. In this example implementation, the second location verification data 118 is sent to the remote control via a short-range communication between the short-range communication module 302 of the mobile device 114 and a short-range communication module (not shown) of the remote control of the television appliance 102. In this way, the mobile device 114 updates the second remote control key codes of remote control.

At step 408, the television appliance 102 receives the first location verification data 112, for example via the broadcast receiver 204, and stores it in memory 210. In the example implementation where the remote control of the television appliance 102 has been disabled, the first location verification data 112 includes the first remote control key codes.

At step 410, the television appliance 102 receives the second location verification data 118 via the short-range communication module 202. In the example implementation where the remote control of the television appliance 102 has been disabled, the remote control of the television appliance 102 receives the second location verification data 118, including the second remote control key codes, via a short-range communication module (not shown) of the remote control which, prior to this, has received the second location verification data 118, including the second remote control key codes, from the mobile device 114.

At step 412, the comparison module 206 compares the first location verification data 112 and the second location verification data 118 and determines whether they are considered to match. One or more of a number of factors may be taken into consideration when determining whether the first location verification data 112 and the second location verification data 118 are considered to match. A determination may be made as to whether the two Unique IDs match. A determination may be made as to whether the first and second timestamps are within a predetermined time period of one another. A determination may be made as to whether the received current location of the mobile device 114 is within a predetermined distance from the stored location of the television appliance 102. The predetermined distance may be any one of 200, 100, 50 and 10 meters. Any combination of these three determinations may be made in determining whether the first location verification data 112 and the second location verification data 118 match.

If the first and second location verification data match, the location is determined to have been verified at step 414. The disabled function of the television appliance 102 may then be enabled. For example, in the example implementation where the remote control of the television appliance 102 has been disabled, the remote control of the television appliance 102 may be enabled. If the first and second location verification data do not match, the location is determined not to have been verified at step 416 and the disabled function of the television appliance 102 remains disabled.

In the example implementation where the remote control of the television appliance 102 has been disabled and the second location verification data 118 has been sent to the remote control of the television appliance 102, the remote control uses the second remote control key codes of the second location verification data 118 for its communications with the television appliance 102.

The comparison module 206 of the television appliance 102, upon receiving a communication from the remote control in the form of one of the second remote control key codes representing a particular action (for example "Volume up"), compares this with the first remote control key codes stored in memory 210. As outlined above, the television appliance 102 will only perform the requested action if the remote control key code sent by the remote control corresponds with one of the first remote control key codes stored in memory 210 of the television appliance 102. It will be apparent that the remote control will remain disabled until such a point that the second remote control key codes match the first remote control key codes such that the remote control can be used to cause the television appliance 102 to perform actions.

It is noted that, if any of the current location of the mobile device 114, the second timestamp and the Unique ID of the television appliance 102 used to generate the second remote control key codes do not match the stored location of the television appliance 102, the first timestamp and the Unique ID of the television appliance 102 used to generate the first remote control key codes, the second remote control key codes will differ from the first remote control key codes meaning that the remote control cannot be used to control the television appliance 102.

Figure 5:
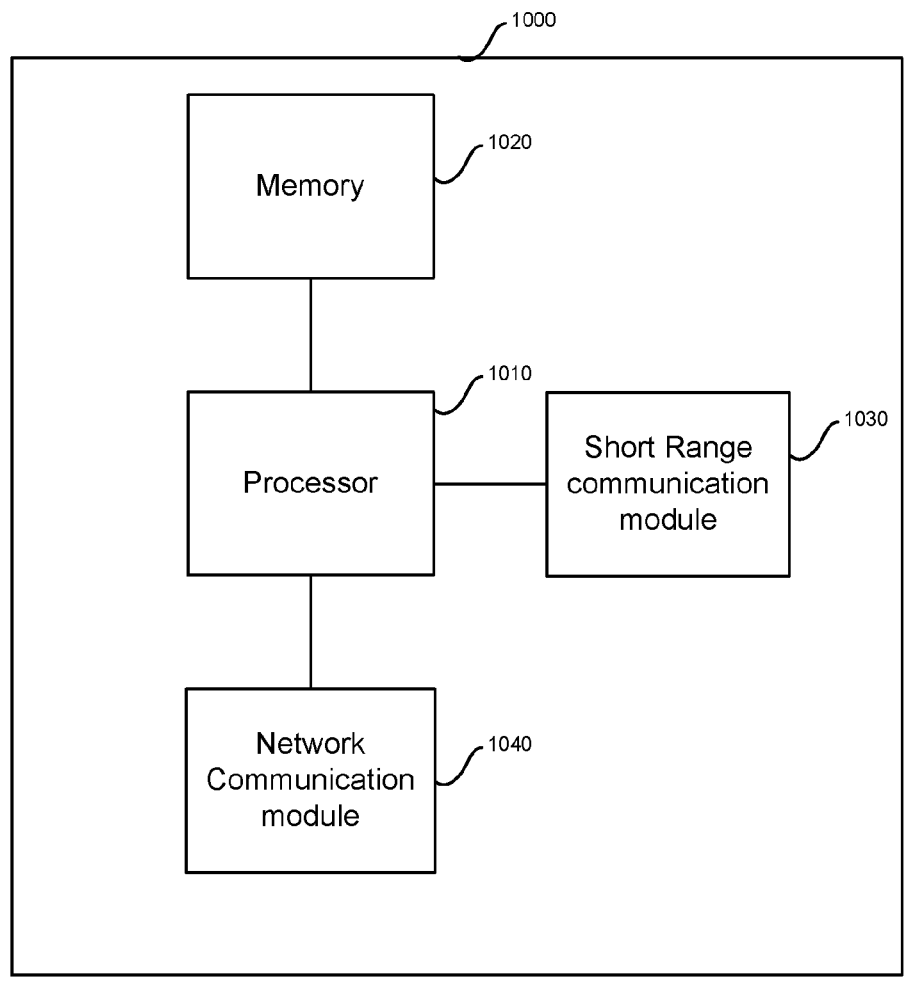
FIG. 5 illustrates a first device.

FIG. 5 illustrates a block diagram of a first device 1000 for the verification of the location of the device 1000. The device can comprise any form of device that needs its location verified by a remote server.

The device 1000 comprises a processor 1010 and a memory 1020 containing instructions for execution by the processor 1010. A short-range communication module 1030 is connected to the processor 1010 to enable receipt of short-range communications from a second device, such as a mobile device. The short-range communications can contain information on the location of the second device and can comprise communications of any form as described herein above. Hence, the first device 1000 can receive information on the location of the second device.

A network communication module 1040 is connected to the processor 1010 and enables the first device 1000 to communication over a communications network with a remote server. The communications to the remote server can include a request for the verification of the first device by the transmission of the received location information from the second device. Communications from the server can include control communications to control a function of the first device, such as to enable or disable the device or a function of the device.

Figure 6:
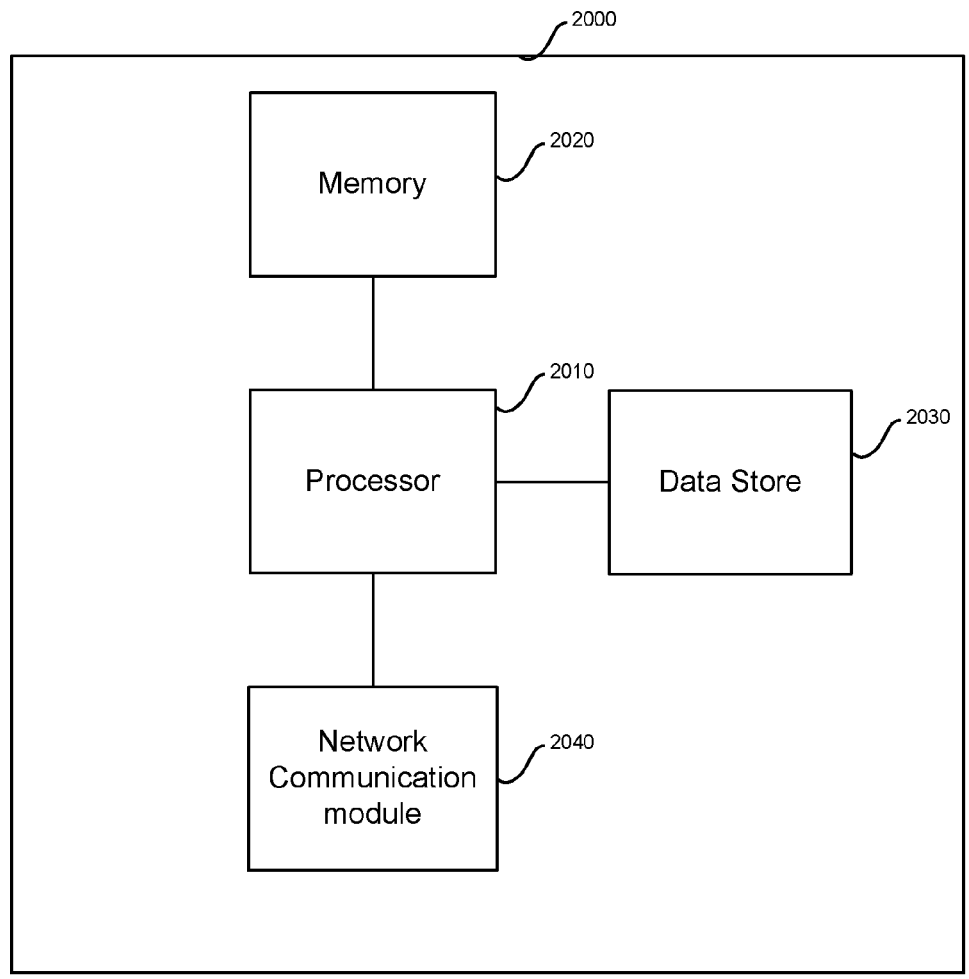
FIG. 6 illustrates a server.

FIG. 6 illustrates a block diagram of a server 2000 for verifying the location of the first device 1000. The server 2000 includes a processor 2010 and a memory 2020 containing instructions for execution by the processor 2010. A data store 2030 is provided connected to the processor 2010 to store first device location data or information, to, for example, define authorized geographic locations for one or more first devices 1000.

A network communication module 2040 is connected to the processor 2010 and enables the server 2000 to communication over a communications network with the first device 1000 in a manner as described with reference to FIG. 5.

Hence, the server 2000 can received information on the location of the second device via the first device 1000 and this can be processed by the processor 2010 to compare it with stored information for the location of the first device 1000. A match can be determined by determining if the location of the first device that is within a range of the location of the second device is also within an allowed range of a stored location or within a predefined geographic area. The first device 1000 can be controlled using communications over the communication network by the server in dependence upon the result of the comparison.

The location information for the second device can include an identifier for the first device for authentication of the location information as part of the verification process.

Figure 7:
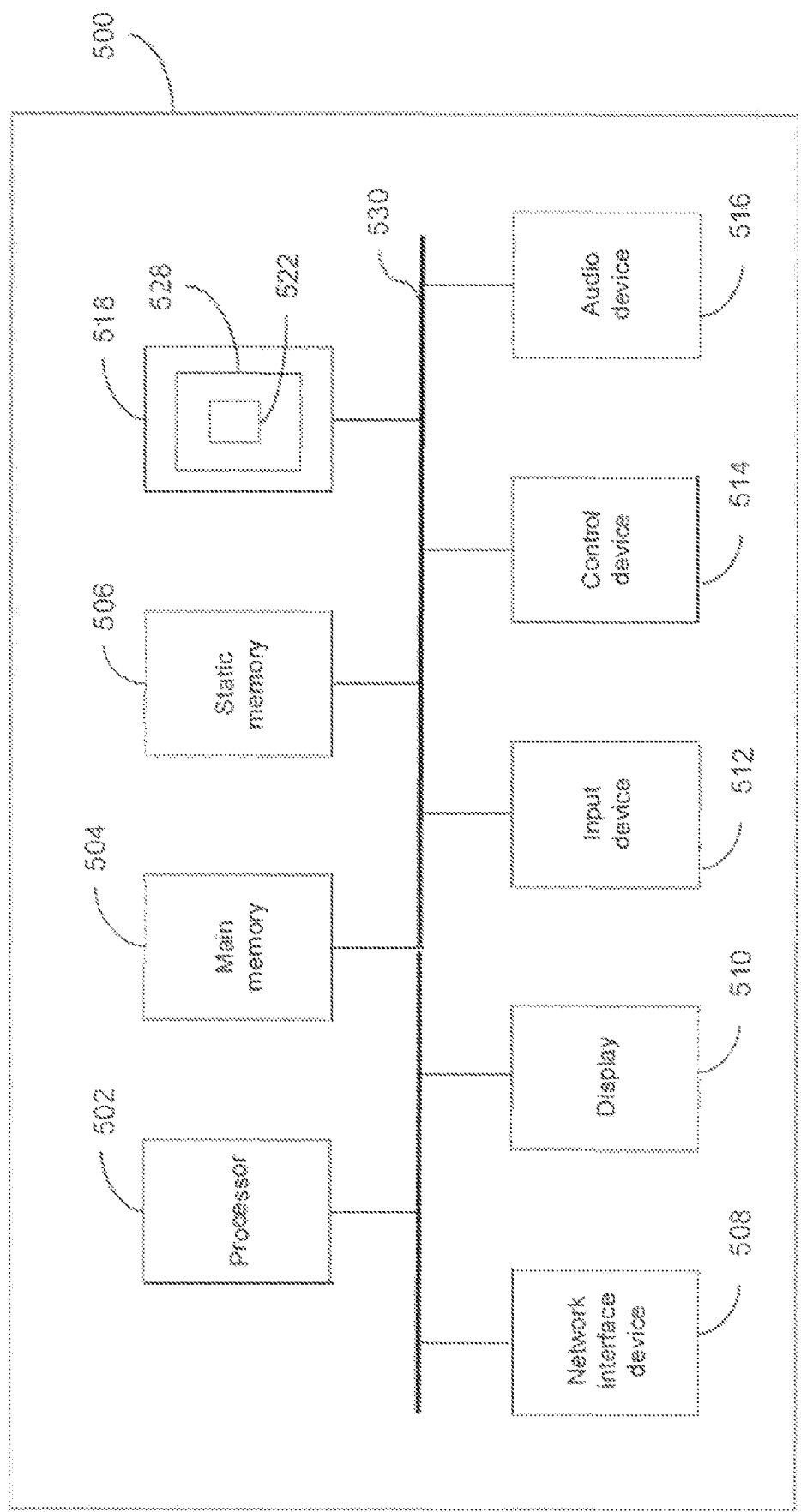
FIG. 7 a block diagram of one implementation of a computing device.

FIG. 7 illustrates a block diagram of one implementation of a computing device 500 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 522) for performing the operations and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard or touchscreen), a cursor control device 514 (e.g., a mouse or touchscreen), and an audio device 516 (e.g., a speaker).

The data storage device 518 may include one or more machine-readable storage media (or more specifically one or more non-transitory computer-readable storage media) 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "sending" "receiving", "requesting", "determining", "comparing", "identifying", "obtaining", "generating", "enabling", "disabling", "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

Having read the above description of some specific embodiments, it will be understood that the following numbered clauses are disclosed:

Clause 1. A method of verifying a location of a first device, the method comprising:
  receiving first location verification data from a server at the first device, wherein the first location verification data is generated using a stored location of the first device;
  receiving second location verification data from a second device at the first device, wherein the second location verification data is generated using a current location of the second device; and
  verifying the location of the first device by determining whether the second location verification data matches the first location verification data.

Clause 2. The method of clause 1, wherein if the second location verification data matches the first location verification data, enabling a disabled function of the first device.

Clause 3. The method of clause 2, further comprising disabling the enabled function of the first device after a predetermined period of time has elapsed following enabling of the function.

Clause 4. The method of any preceding clause, wherein the first location verification data is generated using a first timestamp and/or a Unique ID of the first device.

Clause 5. The method of any preceding clause, wherein the second location verification data is generated using a second timestamp and/or a Unique ID of the first device.

Clause 6. The method clause 5, when dependent upon clause 4, wherein determining whether the second location verification data matches the first location verification data comprises determining whether the first timestamp falls within a predetermined period of time of the second timestamp.

Clause 7. The method clauses 5 or 6, when dependent upon clause 4, wherein determining whether the second location verification data matches the first location verification data comprises determining whether the Unique IDs used to generate the first location verification data and the second location verification data match.

Clause 8. The method of any preceding clause, wherein the second location verification data is received from the second device via a short-range communication mechanism.

Clause 9. The method of any preceding clause, wherein the second location verification data is received from the second device via a third device.

Clause 10. The method of clause 9, wherein the second location verification data is sent from the second device to the third device via a short-range communication mechanism.

Clause 11. The method clause 9 or clause 10, wherein the second location verification data is sent from the third device to the first device via a short-range communication mechanism.

Clause 12. The method any of clauses 9 to 11, wherein the third device comprises a remote control for controlling the first device and, wherein the first location verification data comprises a first remote control key code and, wherein the second location verification data comprises a second remote control key code and, optionally wherein the first location verification data comprises first remote control key codes and the second location verification data comprises second remote control key codes.

Clause 13. The method of clause 12, wherein determining whether the second location verification data matches the first location verification data comprises determining whether the first remote control key code matches the second remote control key code.

Clause 14. The method of any preceding clause, wherein the first location verification data is generated by the server.

Clause 15. The method of any preceding clause, wherein the second location verification data is generated by the second device and, optionally, is not sent to the server.

Clause 16. The method of any preceding clause, wherein the step of verifying the location of the first device by determining whether the second location verification data matches the first location verification data is performed at the first device.

Clause 17. The method of any preceding clause, wherein second location verification data is generated by the second device.

Clause 18. The method of any preceding clause, wherein the first location verification data is received after a request to enable a previously disabled function of the first device has been sent to the server by the second device.

Clause 19. The method of any preceding clause, wherein determining whether the second location verification data matches the first location verification data comprises determining whether the current location of the second device is within a predetermined distance from the stored location of the first device.

Clause 20. A method of providing data for use in verifying a location of a first device, the method comprising:
  obtaining a current location of a second device at a second device;
  generating second location verification data at the second device, wherein the second location verification data is generated using the current location of the second device; and
  sending the second location verification data to the first device for use in verifying the location of the first device.

Clause 21. The method of clause 20, wherein the second location verification data is sent to the first device via a short-range communication mechanism.

Clause 22. The method of clause 20 or clause 21, wherein the second location verification data is sent to the first device via a third device.

Clause 23. The method of clause 22, wherein the second location verification data is sent from the second device to the third device via a short-range communication mechanism.

Clause 24. The method clause 22 or clause 23, wherein the second location verification data is sent from the third device to the first device via a short-range communication mechanism.

Clause 25. The method any of clauses 22 to 24, wherein the third device comprises a remote control for controlling the first device and, wherein the second location verification data comprises a remote control key code and, optionally wherein the second location verification data comprises second remote control key codes.

Clause 26. The method any of clauses 20 to 25, further comprising the step of sending, by the second device, a request to enable a previously disabled function of the first device to a server.

Clause 27. The method any of clauses 20 to 26, wherein the second location verification data is generated using a second timestamp and/or a Unique ID of the first device.

Clause 28. The method of any preceding clause, wherein the second device comprises a mobile device.

Clause 29. The method according to any preceding clause, wherein the first device comprises a media consumption device.

Clause 30. The method of clause 29, wherein the first device is a television appliance comprising a television broadcast receiver for receiving broadcast media content.

Clause 31. The method of any preceding clause, wherein the stored location of the first device is provided to the server by a user of the first device.

Clause 32. A first device comprising a processing environment configured to carry out the method of any of clauses 1 to 19 and clauses 28 to 31, when dependent upon any of clauses 1 to 19.

Clause 33. A second device comprising a processing environment configured to carry out the method of any of clauses 20 to 27 and clauses 28 to 31, when dependent upon any of clauses 20 to 27.

Clause 34. A system comprising the first device of clause 32 and the second device of clause 33.

Clause 35. A device comprising a processing environment configured to carry out the method according to any preceding clause.

Clause 36. A computer program product comprising instructions which, when the program is executed by a computer, cause the computer to carry out the method of any of clauses 1 to 31.

Clause 37. A non-transitory computer readable medium having computer-executable instructions that, when executed on a computer system, implement the method of any of clauses 1 to 31.

The invention claimed is:

1. A method comprising:
receiving, by a first device, first location verification data from a server, the first location verification data indicating a stored location of the first device;
receiving, by the first device, a first control key code from a second device comprising a remote control;
receiving, by the first device, second location verification data in the form of a second control key code from a smart device, the second location verification data indicating a location of the smart device, the location of the smart device determined using a Global Positioning System (GPS) receiver; and
verifying, by the first device, that a location of the first device is within a predetermined range of the stored location by comparing the second location verification data with the first location verification data.

2. The method of claim 1, further comprising:
based on the location of the first device being verified as being with the predetermined range of the stored location, enabling a disabled function of the first device.

3. The method of claim 2, further comprising:
disabling the function of the first device after a predetermined period of time has elapsed following enabling of the function.

4. The method of claim 1, further comprising:
sending a request, by the first device and to the server, for the first location verification data, the request comprising a unique identifier of the first device.

5. The method of claim 1, wherein the second location verification data is received from the smart device via the remote control.

6. The method of claim 5, wherein the second location verification data is sent from the remote control to the first device via a short-range communication mechanism.

7. The method of claim 5, wherein the first location verification data comprises a third remote control key code.

8. The method of claim 7, wherein the comparing of the first location verification data with the second location verification data comprises determining whether the third remote control key code matches the second remote control key code.

9. A device comprising:
memory that stores instructions; and
one or more processors configured by the instructions to perform operations comprising:
receiving first location verification data from a server, the first location verification data indicating a stored location of the device;
receiving a first control key code from a second device comprising a remote control;
receiving second location verification data in the form of a second control key code from a smart device, the second location verification data indicating a location of the smart device, the location of the smart device determined using a Global Positioning System (GPS) receiver; and
verifying that a location of the device is within a predetermined range of the stored location by comparing the second location verification data with the first location verification data.

10. The device of claim 9, wherein the operations further comprise:
based on the location of the device being verified as being with the predetermined range of the stored location, enabling a disabled function of the device.

11. The device of claim 10, wherein the operations further comprise:
disabling the function of the device after a predetermined period of time has elapsed following enabling of the function.

12. The device of claim 9, wherein the operations further comprise:
sending a request, to the server, for the first location verification data, the request comprising a unique identifier of the device.

13. The device of claim 9, wherein the second location verification data is received from the smart device via the remote control.

14. The device of claim 13, wherein the second location verification data is sent from the remote control to the device via a short-range communication mechanism.

15. The device of claim 13, wherein the first location verification data comprises a third remote control key code.

16. The device of claim 15, wherein the comparing of the first location verification data with the second location verification data comprises determining whether the first third remote control key code matches the second remote control key code.

17. A non-transitory computer readable medium having computer-executable instructions that, when executed by one or more processors of a device, cause the one or more processors to perform operations comprising:

receiving first location verification data from a server, the first location verification data indicating a stored location of the device;

receiving a first control key code from a second device comprising a remote control;

receiving second location verification data in the form of a second control key code from a smart device, the second location verification data indicating a location of the smart device, the location of the smart device determined using a Global Positioning System (GPS) receiver; and verifying that a location of the device is within a predetermined range of the stored location by comparing the second location verification data with the first location verification data.

18. The non-transitory computer readable medium of claim 17, wherein the operations further comprise:

based on the location of the device being verified as being with the predetermined range of the stored location, enabling a disabled function of the device.

19. The non-transitory computer readable medium of claim 18, wherein the operations further comprise:

disabling the function of the device after a predetermined period of time has elapsed following enabling of the function.

20. The non-transitory computer readable medium of claim 17, wherein the operations further comprise:

sending a request, to the server, for the first location verification data, the request comprising a unique identifier of the device.

\* \* \* \* \*